Dec. 12, 1933.                G. F. YAGER ET AL                1,939,585
                              MOLD FORMING MACHINE
                    Filed Aug. 31, 1931          3 Sheets-Sheet 1

INVENTORS
George F. Yager
Oliver S. Heath
BY
Whittemore, Hulbert, Whittemore & Belknap
ATTORNEYS

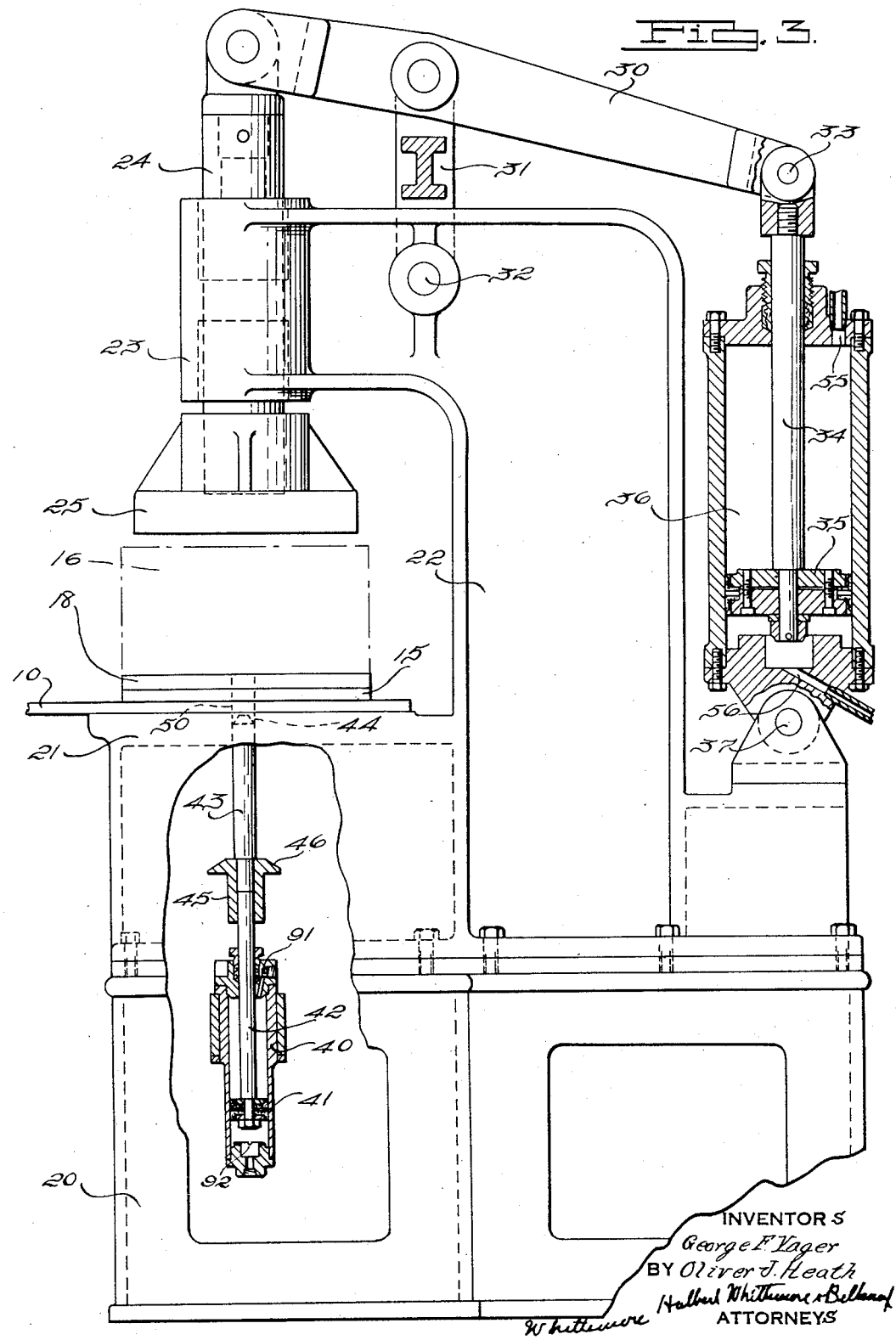

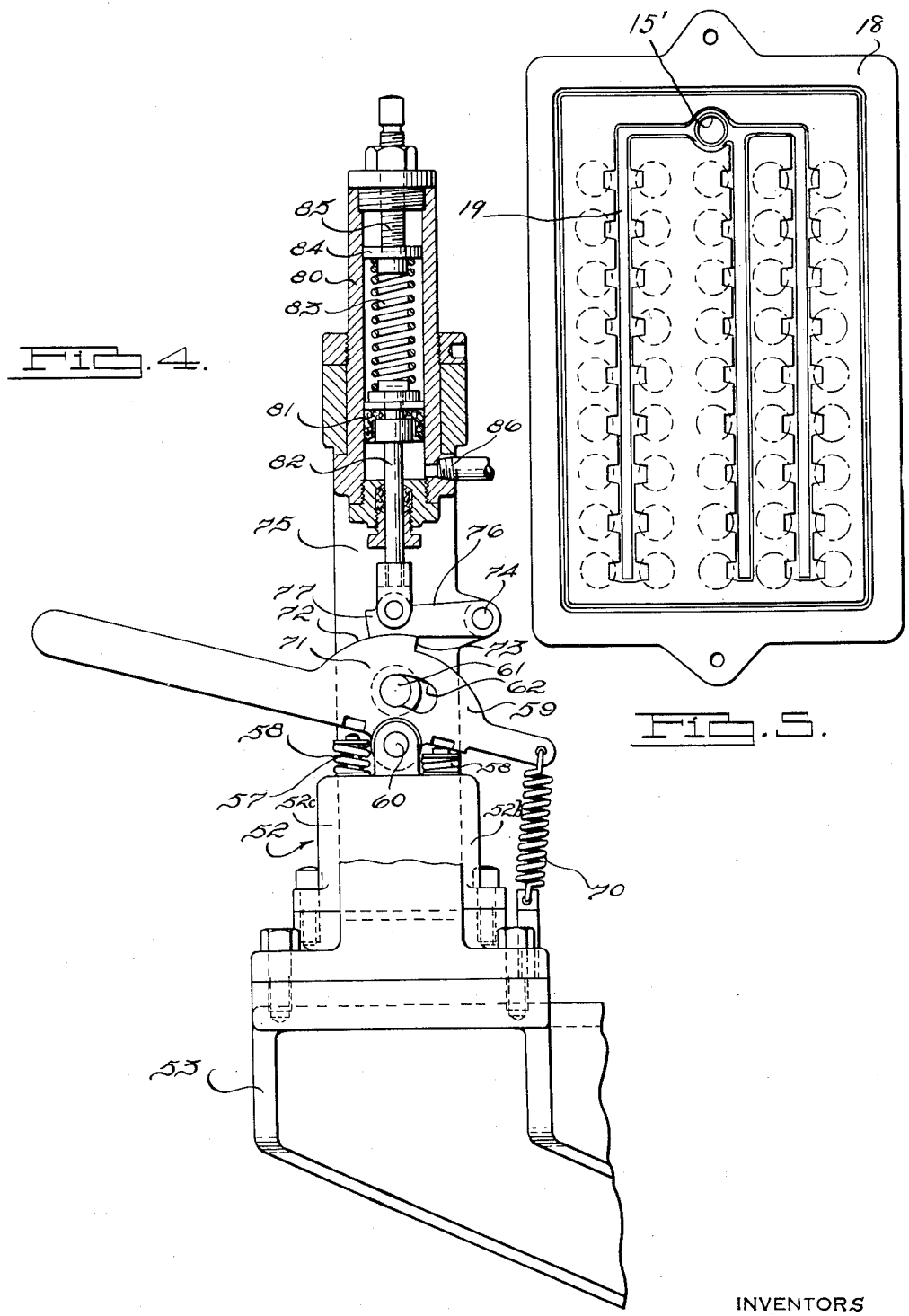

Patented Dec. 12, 1933

1,939,585

UNITED STATES PATENT OFFICE 1,939,585

MOLD FORMING MACHINE

George F. Yager and Oliver J. Heath, Toledo, Ohio, assignors to The Bunting Brass & Bronze Company, Toledo, Ohio, a corporation of Ohio Application August 31, 1931. Serial No. 560,455

7 Claims. (Cl. 22—42)

This invention relates to a machine for use in the forming of molds and the like.

One of the primary objects of this invention is to provide a turntable or like conveyor for moving a flask to a position to be acted upon by a mold forming mechanism and to provide means whereby a portion of the mold forming mechanism functions to lock the conveyor against movement during the mold forming operation.

A further object of this invention is to provide a mold forming mechanism which will include a squeeze plate and to provide means for accurately regulating the force exerted by the squeeze plate during the mold forming operation.

A still further object of this invention is to provide means associated with the conveyor for vibrating the flask when the latter is properly positioned with respect to a mold forming mechanism.

Numerous other objects and advantages of this invention will become more apparent as the following description proceeds particularly when reference is had to the accompanying drawings, wherein:

Fig. 3 is a side elevational view of the mold forming mechanism per se, parts being broken away for the sake of clearness;

Fig. 4 is a detail elevational view partly in section showing a portion of the structure shown in Fig. 1; and Fig. 5 is a plan view of the pattern plate forming a part of the structure shown in Fig. 1.

Figure 1:
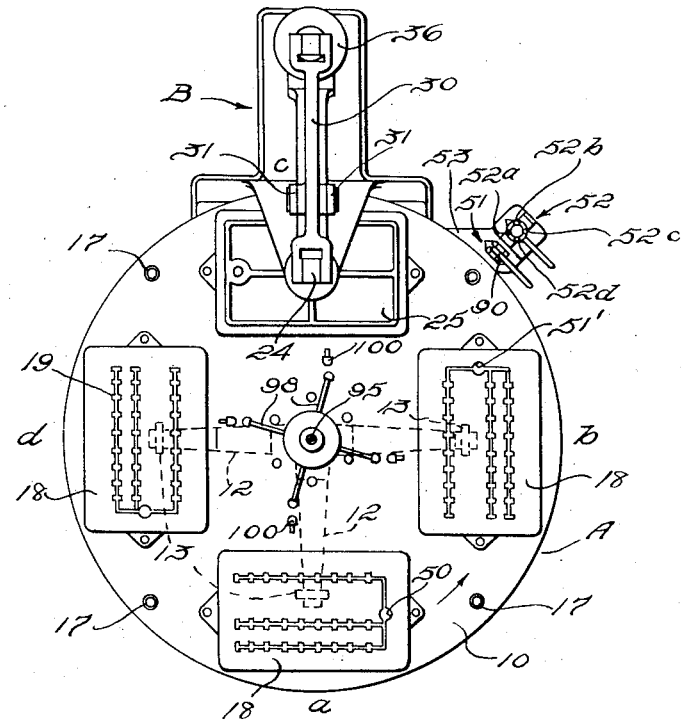
Fig. 1 is a top plan view of a mold forming machine constructed in accordance with the teachings of this invention.
Figure 2:
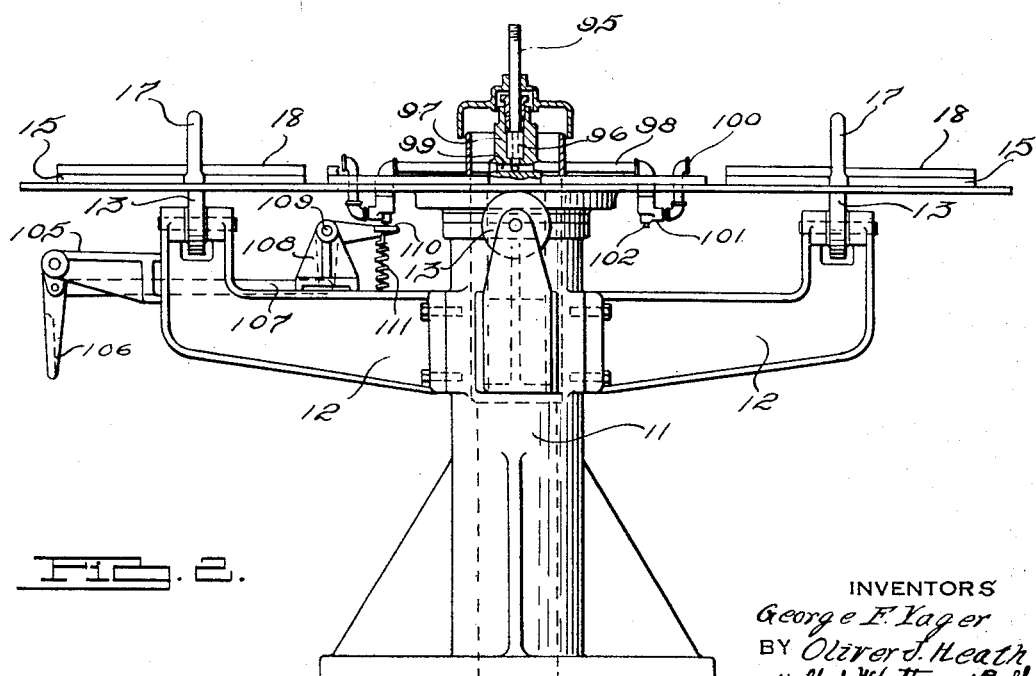
Fig. 2 is a side elevational view of a portion of the structure shown in Fig. 1.

The construction forming the subject matter of this application is adapted more particularly for the forming of the cope of the mold. During the following description the machine will therefore be referred to as being adapted for this purpose. It will be readily apparent, however, that with slight modifications the machine will be adapted for use in the forming of any part of a mold, and the invention is therefore to be understood as covering not only a cope forming machine, but also a machine for forming other parts of a mold, the invention being limited only by the scope of the appended claims.

Referring then particularly to the drawings wherein like reference characters designate corresponding parts throughout all views, the machine is shown as comprising a conveyor designated generally by the reference character A and a mold forming machine designated generally by the reference character B. The conveyor A is illustrated as comprising a dial or turntable 10 rotatably journaled on a suitable supporting pedestal 11. This pedestal is provided adjacent its upper end with the radially extending arms 12, and journaled in the outer ends of these arms are rollers 13 which rotatably support the dial adjacent the outer periphery thereof.

The dial is arranged to be rotated to four stations designated by the reference characters $a$, $b$, $c$, and $d$, respectively, and the dial is therefore provided on its upper face with four riser blocks or supports 15 spaced equally circumferentially of the table so that when one of the supports is in one of the stations, the other three supports are in the remaining three stations. Mounted on each support is a pattern plate 18 having patterns 19 thereon to form the desired channels in the cope, as will hereinafter be more fully brought out.

During the operation of the machine, a flask 16 will be placed on a pattern plate at station $a$. The turntable will then be rotated in the direction of the arrow in Fig. 1 of the drawings to move the flask to station $b$, at which time the flask will be filled with sand. The table will then be rotated to move the flask to station $c$, at which time the cope will be formed in the flask by actuation of the machine B, after which the turntable will be rotated to move the flask to station $d$ from which the flask may be removed to be associated with a suitable drag which has been simultaneously formed on an associated machine. For the purpose of rotating the table, handles 17 are fixed to the upper surface thereof, these handles projecting upwardly from the turntable and being spaced so that one handle is always in position for actuation by the operator.

The mold forming machine is illustrated more particularly in Fig. 3 of the drawings, and by reference to this figure it will be noted that this part of the construction comprises a base 20 arranged to one side of the turntable 10. This base carries a platform 21 which projects under the adjacent portion of the dial, as clearly illustrated. Projecting upwardly from the base is a standard 22, and this standard is shaped to extend laterally to a position over the platform 21 and above the dial 10. At its free end the standard terminates in a bearing 23 for reciprocably mounting a shaft 24. This shaft carries at its lower end a squeeze plate 25 which upon downward movement of the shaft, is arranged to compress or squeeze the sand in the flask, as will be readily apparent.

The shaft 24 is pivotally connected at its upper end to a link 30. This link is pivoted intermediate its ends to the upper ends of a pair of links 31, and these links are in turn pivoted as at 32 to the adjacent portion of the standard 22. At its end opposite to its point of connection of the shaft 24, the link 30 is pivotally connected as at 33 to a piston rod 34, and fixed to the lower end of this piston rod is a piston 35. This piston is mounted for reciprocation within a cylinder 36 which is pivoted as at 37 on the base 20. It will be apparent that the pivotal mounting of the cylinder 36 and the pivotal mounting of links 31 provide for the necessary movement of link 30 to effect a vertical reciprocation of shaft 24 upon reciprocation of piston 35 in cylinder 36.

Mounted in the base 20 below the platform 21 is a cylinder 40. Mounted for reciprocation in this cylinder is a piston 41, and this piston is fixed to a piston rod 42 which projects upwardly through the top of the cylinder and carries at its upper end a plunger 43 mounted to be projected through an opening 44 in the platform 21 upon upward movement of piston 41. A collar 45 serves not only as a means for connecting the plunger 43 to the piston rod 42, but is provided with a flange 46 arranged to abut the under side of platform 21 to limit upward movement of the plunger 43.

The plunger 43 is provided for the purpose of forming the sprue in the cope. The dial 10 is therefore provided adjacent each support 15 with an opening 50, and each pattern plate is formed with an opening 51' aligned with an opening 50 through which the plunger 43 may be projected. The arrangement is such that when a platform is brought into station c and is properly positioned in this station, the openings 50 and 50' adjacent this platform will be aligned with the opening 44 in platform 21 so that the plunger 43 may be projected upwardly through these aligned openings and into the cope to form the sprue therein. It will further be apparent that projection of the plunger through the aligned openings in the platform and turntable will lock the turntable against rotation during the mold forming operation and will insure the proper positioning of the flask in station c.

According to the teachings of this invention the squeeze plate and plunger 43 are both actuated by fluid under pressure such as compressed air or the like. For the purpose of controlling the flow of fluid under pressure to the several cylinders, as will hereinafter be more fully described, valves 51 and 52 are provided, these valves being supported on a lateral extension 53 of the base 20 in a position where they may be readily actuated by an operator standing near the turntable and adjacent station c.

Referring first to the means for actuating the squeeze plate, it will be noted that the cylinder 36 is provided adjacent its upper and lower ends with the ports 55 and 56, respectively. The valve 52 is provided for controlling the flow of fluid under pressure to and from this cylinder 36. This valve may be of any standard construction of double acting valve such, for example, as the Ross valve, and it is therefore believed unnecessary to describe in detail the structure and operation of this valve. It is believed sufficient to state that the valve is suitably connected to a source of fluid under pressure and to a suitable exhaust. The valve includes four valve members designated by the reference characters $52^a$, $52^b$, $52^c$ and $52^d$. These valves are provided with stems 57, and sleeved on these stems are springs 58 which normally hold these valves closed. A lever 59 is pivotally mounted as at 60 on the valve casing and is limited in its pivotal movement by engagement of a pin 61 in an arcuate slot 62 formed in the lever, as will be readily apparent. Rocking of the lever about its pivot causes the same to actuate either the valves $52^a$ and $52^b$ or the valves $52^c$ and $52^d$, as will be readily apparent.

A spring 70 normally holds the lever 59 in the position shown in Fig. 4 of the drawings, and when the lever is in this position the valves $52^a$ and $52^b$ are actuated to admit fluid under pressure to port 55 and to connect port 56 to the exhaust. The piston 35 will thus be held in its lowermost position, as illustrated in Fig. 3 of the drawings, and the squeeze plate will be elevated. If, however, the lever 59 is rocked about its pivot to actuate valves $52^c$ and $52^d$, the port 56 will be connected to the source of fluid under pressure while the port 55 will be connected to the exhaust with the result that the piston 35 will be forced upwardly in cylinder 36, and squeeze plate 25 will be moved downwardly to compress the sand in the flask 16.

The present invention contemplates the provision of means for regulating the pressure exerted on the squeeze plate 25, and for this purpose a suitable pressure controlled locking means is provided, this means being illustrated in Fig. 4 of the drawings.

By reference to this figure it will be noted that the lever 59 is provided intermediate its ends with an enlarged portion 71, and the upper face 72 of this enlarged portion is rounded, being shaped to conform to an arc struck from the pivot point 60 of the lever. A shoulder 73 is formed in the surface 72 intermediate the ends thereof. Pivoted as at 74 on a support 75 which projects upwardly from the valve casing is a locking member 76, the under face of which is rounded to engage the face 72 on the lever. The locking member is provided with a shoulder 77 arranged to engage the shoulder 73 when the lever 59 is moved to a position to actuate valves $52^c$ and $52^d$.

Fixed to the upper end of the support 75 is a cylinder 80, and mounted for vertical reciprocation in this cylinder is a piston 81. A piston rod 82 connects the piston 81 to the locking member 76, while a spring 83 engages the upper end of the piston to normally urge the piston and the locking member down into engagement with the surface 72 of the lever 59. A plate 84 within the cylinder 80 constitutes an abutment for the upper end of spring 83, and this plate is arranged to be adjusted longitudinally of the cylinder by a set screw or the like 85 whereby the tension of the spring acting on the piston may be adjusted.

The cylinder 80 is provided adjacent its lower end with a port 86, and this port is in constant communication with the fluid supply line which connects valve 52 to port 56 in cylinder 36. The arrangement is such that when lever 59 is actuated to open valves $52^c$ and $52^d$ to thus admit fluid under pressure to the under side of piston 35 and to connect port 55 with the exhaust, the fluid under pressure is not only supplied to cylinder 36 by way of port 56, but is also supplied to cylinder 80 by way of port 86. Further, when the lever arm 59 is rocked to actuate these valves, the shoulder 73 is moved to the left of the locking element 76 with the result that the spring 83 forces the locking element downwardly to engage the shoulder 77 thereof with the shoulder 73. The arm 59 is thus held in this position against the tension of the spring 70, and fluid under pressure is supplied to cylinder 36 below piston 35.

It will be understood that since ports 86 and 56 are connected to a common supply line, equal pressure will be built up in cylinders 36 and 30 below pistons 35 and 81, respectively. When the pressure in cylinder 80 becomes greater than the pressure of the spring tending to hold the piston 81 downwardly, the piston is forced upwardly to disengage the shoulder 77 from the shoulder 73 and to permit the return of lever 59 to the position shown in Fig. 4 of the drawings. This will cut off the supply of fluid under pressure to port 56 and will connect this port to the exhaust while admitting fluid under pressure to cylinder 36 by way of port 55. It will thus be apparent that the pressure at which spring 83 is set will govern the pressure with which the squeeze plate 25 will be forced into engagement with the sand in the flask and that this pressure may be adjusted by properly adjusting the abutment plate 84.

The valve 51 is similar to the valve 52 in that it is a double-acting valve of standard construction, and this valve is provided with the hand lever 90 for controlling the same, this hand lever being similar to the lever 59. The lever 90 is not, however, provided with any locking mechanism and is arranged merely to actuate the valve 51 in the standard manner. The valve 51 is adapted to connect ports 91 and 92 formed in the upper and lower ends respectively, of cylinder 40 to a supply of fluid under pressure and to an exhaust in the usual manner. Thus by properly actuating hand lever 90, the piston 41 and the plunger 43 may be projected upwardly or retracted as desired.

The invention further contemplates the provision of means for vibrating the flask during the cope forming operation. For this purpose there is provided a conduit 95 arranged centrally of the pedestal 11 and connected to a suitable source of fluid under pressure (not shown). This conduit discharges into a chamber 96 formed in a casting 97 arranged centrally of the table 10. Pipes 98 are tapped into the casting 97 and extend radially therefrom, these pipes being connected to the chamber 96 by bores 99 formed in the casting.

Each pipe 98 terminates at its outer end in a fitting 100 adjacent one of the supports 15, and each pipe is provided intermediate its ends with a portion 101 which depends below the dial 10. The portion 101 of each pipe is provided with a suitable valve adapted to be actuated by a stem 102.

Fixed to the arm 12 which projects toward the cope forming machine is a support 105, and pivotally mounted on this support is a hand lever 106. Connected to this hand lever is a link 107, and this link is connected at its other end to one arm of a bell crank lever 108 pivoted as at 109 on a suitable support carried by the arm 12. The other arm 110 of the bell crank lever is arranged to engage the valve stem 102 when the turntable is rotated to position the adjacent support 15 in station c. A spring 111 normally holds the end 110 of the bell crank lever out of its engaging position.

The arrangement is such that when one of the supports 15 is at the station c, the valve 102 associated with the fitting 100 adjacent this support is brought into position to be engaged by the end 110 of the bell crank lever 108. Thus during the cope forming operation the bell crank lever may be actuated to open the valve 102 so that air will be discharged from the fitting 100 to a suitable air actuated vibrating mechanism 80 (not shown).

For the purpose of describing the operation of the machine, the forming of a single cope will be described in detail. A flask 16 will be placed on the turntable at station a, and the turntable will then be rotated to position this flask at station b. The flask will then be filled with sand, and the turntable will then be rotated to position the filled flask in station c. At this time the valve 51 will be actuated to project plunger 43 upwardly through the aligned openings in the platform 21 and the turntable to thus lock the turntable against rotation and to also at the same time form the sprue in the sand within the flask. The valve 52 will then be actuated to force the squeeze plate downwardly into engagement with the sand to compress the sand into engagement with the pattern plate, it being understood that the pressure exerted by the squeeze plate may be controlled by properly adjusting the spring 83. When the sand has been compressed to the predetermined desired degree, the valve 52 will be automatically actuated to raise the squeeze plate as previously described. During this cope forming operation the lever 106 may be actuated to admit fluid under pressure by way of fitting 100 to a suitable vibrating mechanism to vibrate the cope in accordance with the usual practice.

After the cope has been formed, the valve 51 may be actuated to retract the plunger 43, after which the turntable may be rotated to position the formed cope in station d, from which station the cope may be removed from the turntable.

Thus it will be apparent that the invention provides a mold forming machine which includes first a sprue forming member which functions to lock the turntable or conveyor against movement and in operative position with respect to a cope forming mechanism. The invention further provides a squeeze plate adapted to be actuated by fluid under pressure and provides means for accurately regulating the pressure exerted on the cope by this squeeze plate. The invention further provides vibrator control valves or mechanisms so arranged as to be brought into registration with an actuating means when a flask is properly positioned with respect to the cope forming mechanism.

While the invention has been described with some detail, it is to be understood that the description is for the purposes of illustration only and is not definitive of the limits of the inventive idea. The right is reserved to make such changes in the details of construction and arrangement of parts as will fall within the purview of the attached claims.

What we claim as our invention is:

1. In a mold forming machine of the character described, the combination with a squeeze plate movable to and from a cope, and fluid pressure actuated means for moving said squeeze plate, of means for controlling the flow of fluid under pressure to said means including a normally closed valve, means for opening the valve including a pivotally mounted lever, said lever being provided intermediate its ends with an enlarged portion, the upper face of said enlarged portion being rounded so as to conform to an arc struck from the pivot point of the lever and provided with a shoulder, means for holding the lever in valve opening position including a pivoted latch member alternately engageable with said face and shoulder, and actuating means for said latch member including a piston rod connected to the member, a spring spaced from the rod, and a member between the rod and spring actuable by the latter and responsive to a predetermined change in pressure of the fluid aforesaid to actuate the rod, member and spring.

2. In a mold forming machine of the character described, the combination with a squeeze plate movable to and from a cope, and fluid pressure actuating means for moving said squeeze plate, of means for controlling the flow of fluid under pressure to said means including a normally closed valve, means for opening the valve including a pivotally mounted lever provided with a shoulder, means for holding the lever in valve opening position including a pivoted latch member engageable with said shoulder, a cylinder above the latch member, and actuating means for said latch member including three elements arranged in line in said cylinder and adapted to impart thrust to each other, one of said elements being a piston, another of said elements being a spring upon one side of the piston, and the third of said elements being a rod upon the other side of said piston and pivotally connected to said latch member.

3. In a mold forming machine of the character described, the combination with a squeeze plate movable to and from a cope, and fluid pressure actuating means for moving said squeeze plate, of means for controlling the flow of fluid under pressure to said means including a normally closed valve, means for opening the valve including a pivotally mounted lever provided with a shoulder, means for holding the lever in valve opening position including a movable latch member engageable with said shoulder, a cylinder in line with said latch member and lever, actuating means for said latch member including a piston within the cylinder responsive to a predetermined change in pressure of the fluid aforesaid, a spring within the cylinder upon one side of the piston, and a rod upon the other side of the piston and connected to the latch member, and means associated with the cylinder for varying the tension of the spring for varying the operation of the fluid responsive means.

4. Fluid pressure control means including a normally closed valve, means for opening the valve including a pivotally mounted lever, said lever being provided intermediate its ends with an enlarged portion, the upper face of said enlarged portion being rounded so as to conform to an arc struck from the pivot point of the lever and provided with a shoulder, means for holding the lever in valve opening position including a pivoted latch member alternately engageable with said face and shoulder, and actuating means for said latch member including a piston rod connected to the member, a spring spaced from the rod, and a member between the rod and spring actuable by the latter and responsive to a predetermined change in fluid pressure to actuate the rod, member and spring.

5. Fluid control means including a normally closed valve, means for opening the valve including a pivotally mounted lever provided with a shoulder, means for holding the lever in valve opening position including a movable latch member engageable with said shoulder, a cylinder in line with said latch member and lever, actuating means for said latch member including a piston within the cylinder responsive to a predetermined change in fluid pressure, a spring within the cylinder upon one side of the piston, and a rod upon the other side of the piston and connected to the latch member, and means associated with the cylinder for varying the tension of the spring for varying the operation of the fluid responsive means.

6. In a mold forming machine of the character described, the combination with a squeeze plate movable to and from a cope, and fluid pressure actuating means for moving said squeeze plate, of means for controlling the flow of fluid under pressure to said means including a normally closed valve, means for opening the valve including a pivotally mounted lever, a latch member for holding the lever in valve opening position, a cylinder adjacent the latch member, and actuating means for said latch member including three elements arranged in line in said cylinder and adapted to impart thrust to each other, one of said elements being a piston, another of said elements being a spring upon one side of the piston, and a third of said elements being a rod upon the other side of said piston and connected to said latch member.

7. Fluid control means including a normally closed valve, means for opening the valve including a pivotally mounted lever provided with a shoulder, means for holding the lever in valve opening position including a movable latch member engageable with said shoulder, a cylinder in line with said latch member and lever, and actuating means for said latch member including a piston within the cylinder responsive to a predetermined change in fluid pressure, a spring within the cylinder upon one side of the piston, and a rod upon the other side of the piston and connected to the latch member.

GEORGE F. YAGER.
OLIVER J. HEATH.